May 15, 1956 F. DI STEFANO 2,745,168
SECOND OPERATION PRODUCTION CHUCKING MACHINE
Filed Jan. 5, 1952 5 Sheets-Sheet 2

INVENTOR
FRANK DISTEFANO
BY George Sipkin
ATTORNEY

May 15, 1956 F. DI STEFANO 2,745,168
SECOND OPERATION PRODUCTION CHUCKING MACHINE
Filed Jan. 5, 1952 5 Sheets-Sheet 3
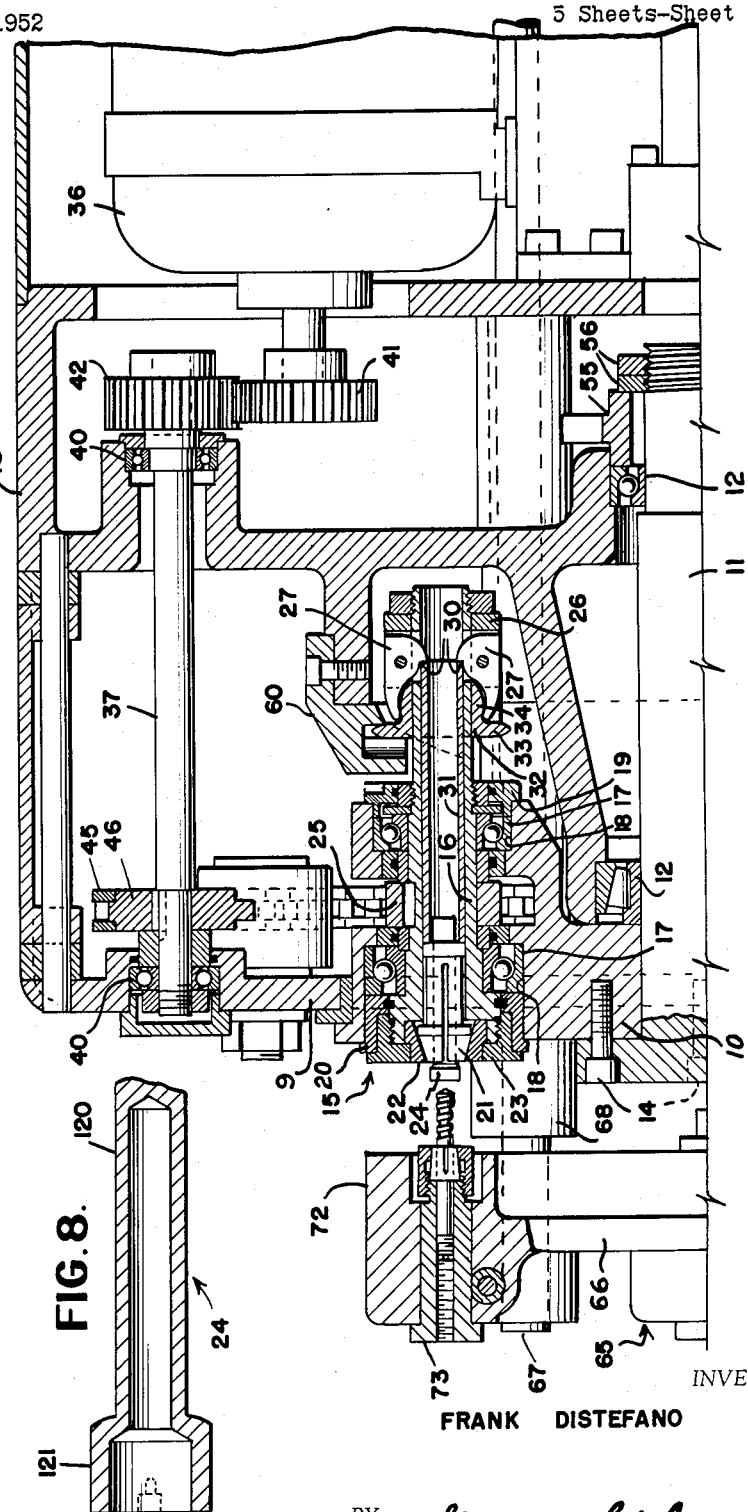
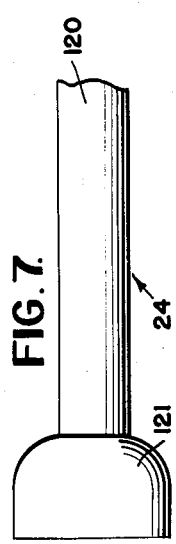
INVENTOR
FRANK DISTEFANO
BY George Sipkin
ATTORNEY May 15, 1956 F. DI STEFANO 2,745,168
SECOND OPERATION PRODUCTION CHUCKING MACHINE
Filed Jan. 5, 1952 5 Sheets-Sheet 4

INVENTOR
FRANK DISTEFANO

BY George Sipkin
ATTORNEY

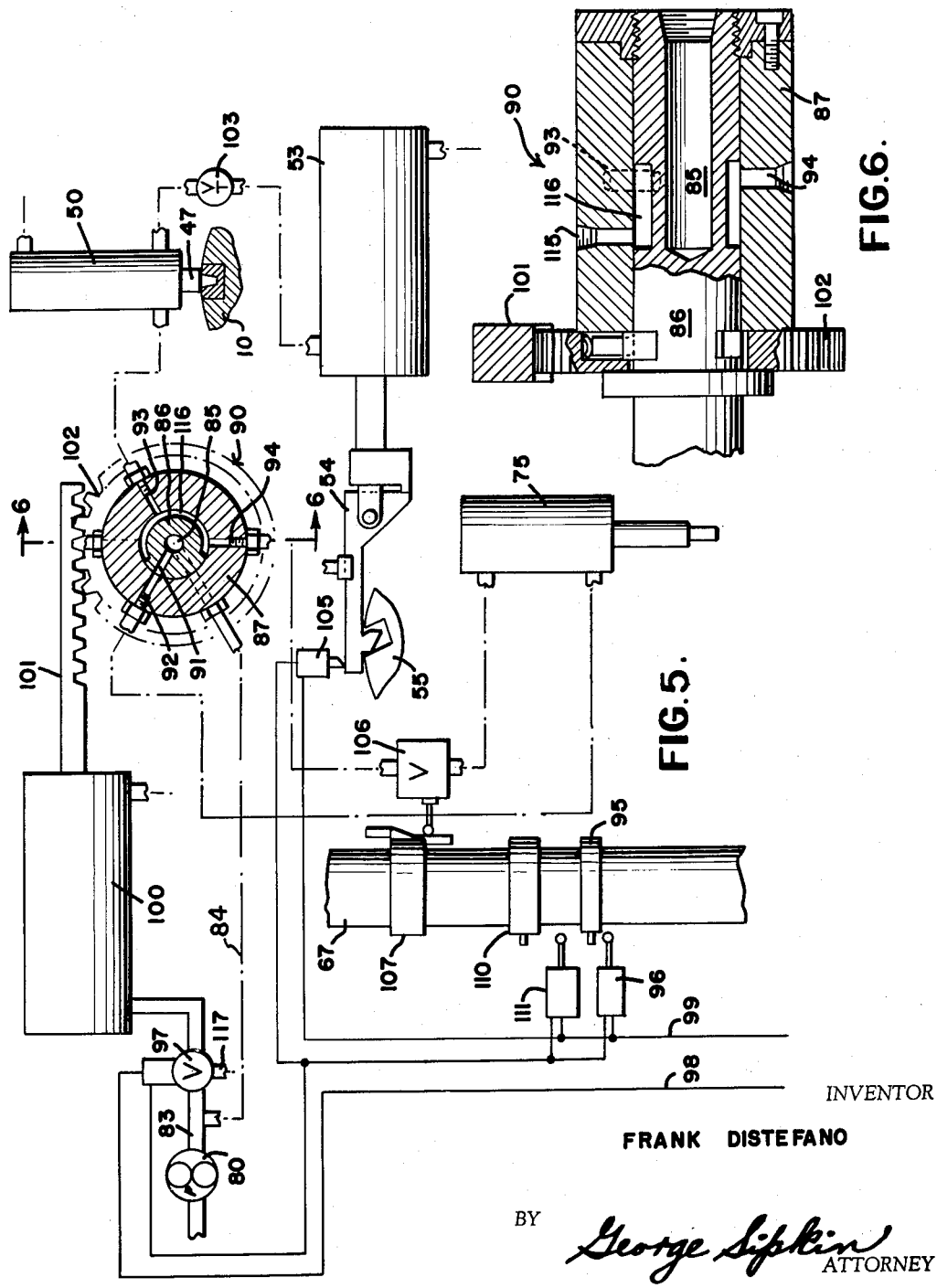

United States Patent Office 2,745,168
Patented May 15, 1956

2,745,168

SECOND OPERATION PRODUCTION CHUCKING MACHINE

Frank Di Stefano, Rochester, N. Y.

Application January 5, 1952, Serial No. 265,151

14 Claims. (Cl. 29—38)

This invention relates to automatic machine tools, and more particularly to automatic chucking machines of the type designed to perform additional machining operations on partially completed piece parts.

Various types of piece parts used in the manufacture of machinery and mechanical apparatus are of such design that some require machine operations on both ends, and others have such physical configuration that they can not be manufactured by conventional automatic screw machines. In order to process such parts on a mass production basis, various types of automatic chucking machines or second operation machines have been developed to handle such parts individually. Generally, such machines include an indexable table carrying a plurality of work rotating spindles and a plurality of rotatable and endwise movable tools adapted to simultaneously perform work on piece parts at different indexed positions of the table. Heretofore such machines have required a substantial amount of costly and complicated gearing and mechanism for obtaining independent operation of the various tools in timed relation with the movement of the table.

An object of the present invention is to provide new and improved automatic machine tools.

Another object of the invention is to provide a new and improved automatic machine designed to perform additional machining operations on partially completed piece parts.

A further object of the invention is to provide an automatic machine having the cutting tools thereof mounted on a common carriage to facilitate positive synchronized movement of all tools with respect to the piece parts carried by the indexable table of the machine.

Still another object of the invention is to provide an automatic chucking machine composed of simple and inexpensive operating and control mechanism.

An automatic metal working machine embodying certain features of the invention may include a rotatable table having a plurality of rotatable work holders positioned spacedly thereon, each of said work holders being designed to receive a piece part to be machined, a slidable tool carriage designed to support a plurality of tools spacedly thereon in axial alignment with the piece parts carried by work holders so that two adjacent work holders are provided as unloading and loading stations of the machine, means for turning the table so as to successively align the piece parts with each tool carried by the tool carriage, means for rotating only the work holders aligned with the tools carried by the tool carriage, means for moving the tool carriage toward and away from the table so as to cause the tools to selectively engage and disengage the rotating piece parts, and control means for synchronizing the movement of the carriage and the table so as to successively position the piece parts at each machining station of the tool carriage.

Other objects and advantages of the invention will appear from the following detailed description of the specific embodiment thereof when read in conjunction with the appended drawings in which:

Figure 3 is a vertical sectional view taken along line 3—3 of Figure 2 when looking in the direction of the arrows;

Figure 5 is a schematic diagram of an electrical circuit and apparatus and a hydraulic system that may be used for controlling the operation of the apparatus shown in Figure 1, the electrical circuit being shown by solid lines and the hydraulic circuit being shown by broken lines;

Figure 6 is a vertical section taken along line 6—6 of the master control valve shown in Figure 5;

Figure 7 is a fragmentary view of a piece part that may be processed by the automatic machine shown in Figure 1;

Figure 8 is a sectional view of the piece shown in Figure 7 illustrating the machining operations to be performed on the part.

Figure 1:
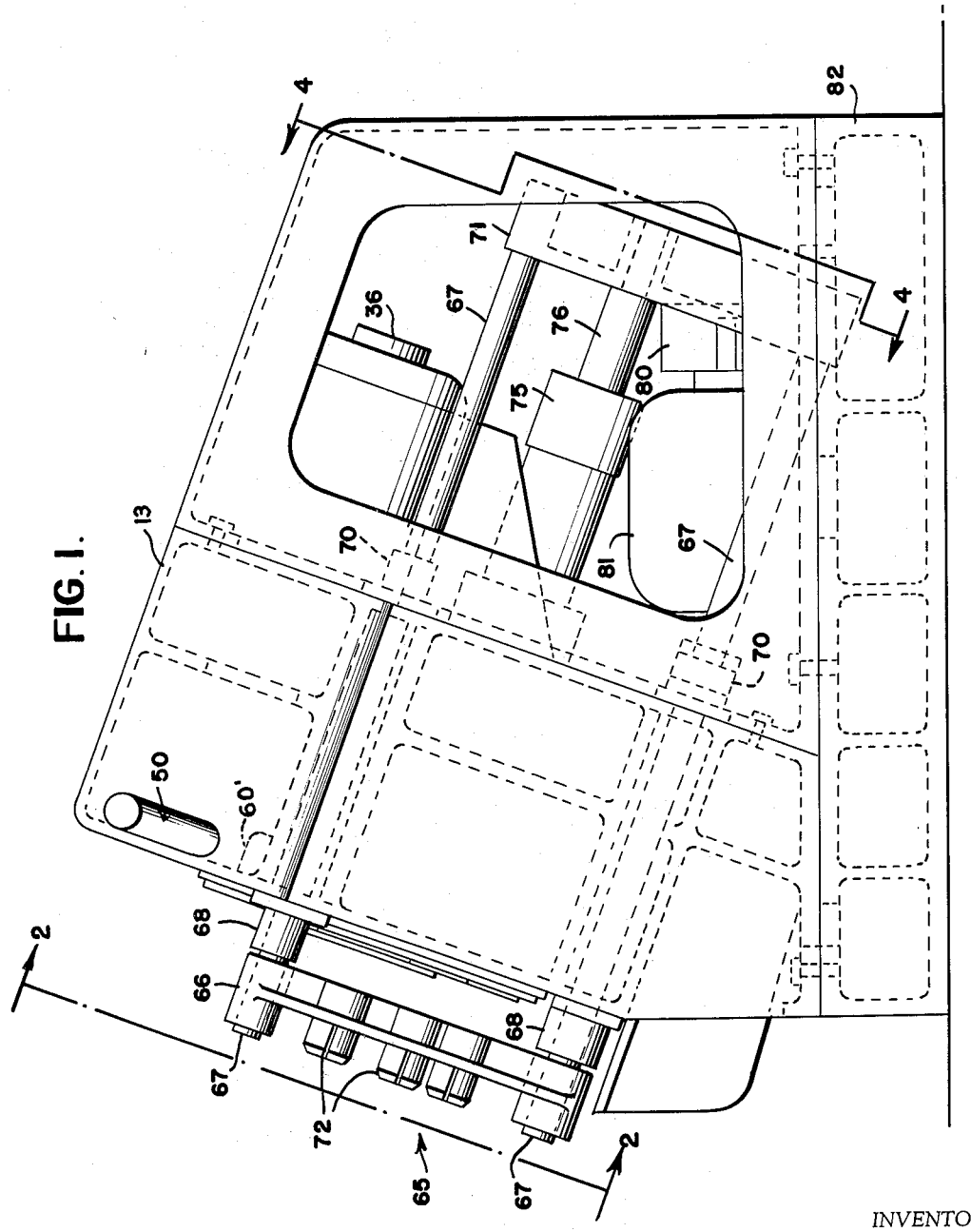
Figure 1 is a side elevation of an automatic machine tool embodying certain features of the invention.

Referring now to the drawings and more particularly to Figures 1 and 3, there is shown an automatic chucking machine which includes a sloping front 9 that comprises a rotatable table 10 secured on a shaft 11 journalled in bearings 12 arranged in a fixed position in a cast steel frame 13 so as to support the shaft 11 obliquely and the table 10 in an angular position with respect to the horizontal axis of the machine. The table 10 is keyed to the shaft 11 by a plurality of bolts 14—14 and is provided with ten equally spaced work holding spindles indicated generally at 15—15. The spindles 15—15 are identical in construction and operation and, therefore, only one of the spindles, shown in detail in Figure 3 of the drawings, will be described in detail herein, it being understood that the spindles are equally spaced about the table 10.

Each spindle 15 includes a tubular body 16 journaled in bearings 17—17 positioned in counter-bores 18—18 provided in the table 10. A nut 19, mounted threadedly on the tubular body 16, holds the body 16 in the bearings 17—17. An annular bushing 20 is positioned in the outer counter-bore 18 so that it rests against the outer bearing 17, and a split collet 21 is positioned slidably in the outer end of the body 16 so as to engage an annular cam 22 secured to the outer end of the body 16 by a nut 23 (Figure 3). The collet 21 is of conventional design and includes a plurality of resilient jaws that can be urged inwardly sufficiently to grip a piece part indicated generally at 24 or released so that a piece part may be readily inserted and removed from the collet. A sprocket wheel 25 is keyed on the spindle body 16 at a point intermediate to bearings 17—17 for rotating the spindle and the collet carried thereby with respect to the table 10.

A collar 26 positioned on the inner end of the tubular body 16 is provided with a plurality of pivotally mounted spring steel fingers 27—27, each finger having a shoulder or stop 30 extending into the central opening of the tubular body 16 and engaging the end of a tubular sleeve 31 mounted slidably in the tubular body 16 of the spindle. The opposite end of the sleeve 31 engages the inner end of the collet 21, as seen in Figure 3. A dog 32, having an annular flange 33 and an arcuate shaped body 34 formed integrally therewith, is positioned slidably on the outside of the tubular body 16 of the spindle 15 (Figure 3). The dog 32 is movable on the body 16 between a front position in which the arcuate shaped body 34 of the dog cams the fingers 27—27 outwardly so that they move the sleeve 31 axially and thereby slide the split collet 21 outwardly frontwardly and against the inside of the cam 22, causing it to grip tightly a piece part positioned therein, and a rear position in which the arcuate body 34 permits the resilient fingers 27—27 to release the sleeve 31 for inward movement, whereupon the resilient jaws of the collet can move the collet to the right and release its grip on the piece part positioned therein.

Figure 2:
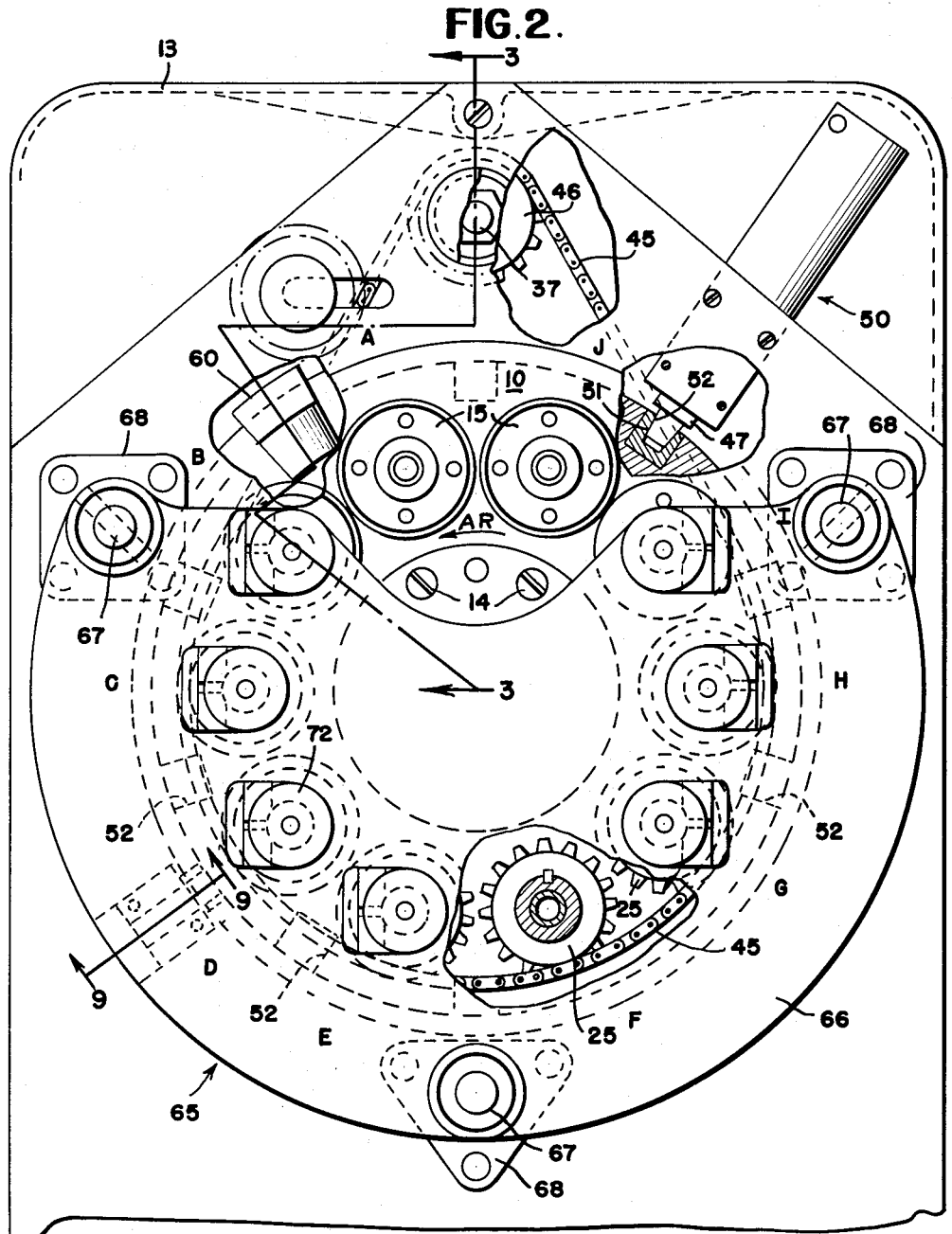
Figure 2 is a front view of the apparatus shown in Figure 1 taken along a plane parallel to the front of the apparatus as indicated by line 2—2 of Fig. 1 but with parts broken away or in section for better illustration.

An electric motor 36 is mounted on the frame 13 to drive a shaft 37 journaled in bearings 40—40 through change gears 41 and 42. An endless roller chain 45 engages the sockets 25—25 of eight of the spindles 14—14 simultaneously and a sprocket 46 mounted on one end of the shaft 37, as seen in Figure 2. The table 10 is locked against rotation in a desired position in any one of a plurality of positions by an indexing pin 47 (Figure 2) which is actuated between a locking position and a release position by a spring loaded hydraulic motor indicated generally at 50. The hydraulic motor 50 is a conventional, reciprocatory device having a piston (not shown) operating in a cylinder in such a manner that oil under pressure moves the piston in a direction to withdraw the frustoconical end 51 of the pin 47 from a tapered recess 52 provided in the periphery of the table 10, it being understood that there are a plurality of recesses 52—52 equally spaced about the periphery of the table corresponding to the spacing between the spindles 15—15 provided on the table 10. A heavy spring (not shown) is provided internally in the motor 50 to bias and move the piston in a direction to drive the end of the pin 47 into the recesses 52—52 provided in the table 10.

A hydraulic motor 53 (Figure 4) is used to actuate a pawl 54 which engages a ratchet 55 secured on the inner end of the main shaft 11 by lock nuts 56—56 (Figure 3). Oil under pressure is directed to the motor 53 so as to move the pawl 54 downwardly, as viewed in Figure 4, and turn the shaft 11 and the table 10 secured thereto in a counter-clockwise direction when viewed in Figure 2. The motor 53 and the pawl 54 are designed to move the table through a distance equal to the spacing between the recesses 52—52 provided in the periphery of the table 10. Each part turn of the table by the motor and pawl is terminated when the pin 47 falls into one of the recesses in the table 10. The motor 53 is provided with a compression spring 57 for returning the pawl 54 to its normal starting position after it has turned the table 10 from one index position to the next succeeding index position as determined by the pin 47 and the recesses 52—52.

The shaft 37 is mounted on the frame 13 of the machine so that it is vertically aligned with the main shaft 11. By virtue of this arrangement, the path of the chain 45 around the sprocket 46 and the sprockets 25—25 provided on the spindles 15—15 is such that the two uppermost spindles are disengaged from the chain 45 and are not driven by the motor 36 for each indexed position of the table. Therefore, for each complete revolution of the table 10 by successive operation of the hydraulic motor 53 and its associated pawl 54, each spindle 15 is disengaged from the chain 45 for two successive indexed positions of the table. In view of the fact that the table 10 is turned in a counter-clockwise direction, as indicated by the arrow AR in Figure 2, it will be convenient to refer to the indexed positions of the table 10 as stations A, B, C, D, E, F, G, H, I and J, beginning with the upper left hand spindle and proceeding in a counter-clockwise direction around the front face of the frame 12.

Thus, the described arrangement of the sprocket 36 on the shaft 37 and the spindles 15 on the table 10 provides an idle spindle at stations A and J so that when each spindle reaches station J a piece part 24 may be unloaded therefrom and when the empty spindle is advanced to station A a piece part 24 may be positioned therein. Since the spindles positioned opposite stations A and J are not engaged by the chain, they are not driven by the motor 36, and a piece part 24 may be readily removed from the spindle and inserted in the spindle without damage to the part and without the possibility of injuring the operator of the machine.

When the hydraulic motor 53 and the pawl 54 turn the table in the manner described, the flange 33 provided on the dog 32 positioned on the spindle 15 moving from station A to station B of the machine engages a cam 60 which is designed to slide the dog longitudinally along the spindle body 16 toward its associated fingers 27—27. This movement of arcuate body 34 of the dog cams the fingers outwardly, and causes the shoulders 30 of the fingers to slide the sleeve 31 longitudinally into the body 16 and urge the collet 21 outwardly whereby the cam 22 closes the jaws of the collet 21 tightly on the piece part 24 positioned in the collet. When the table 10 is turned so as to position this spindle at station B of the machine, the flange 33 of the dog 32 rides off the surface of the cam 60, but the ends of the fingers 27—27 rest in an angular groove 59 provided in the body 34 of the dog and hold the fingers tightly on the dog. It should be noted that the tension of the resilient jaws of the collet 21 acting against the tapered bore of the cam 22 tends to move the sleeve 31 in a direction to urge the sleeve 31 against the shoulder of the fingers 27 and thereby cause them to tightly grip the groove of the dog. As a result, any force applied along the longitudinal axis of the spindles always acts in a direction to cause the fingers 27—27 to force the collet in the cam 22 in a direction to cause it to grip the piece part more tightly.

As the hydraulic motor 53 and the pawl 54 turn the table incrementally so as to advance each spindle station by station through stations A to I, inclusive, the resilient fingers 27—27 mounted on the collar 26 thereof engage the groove in their respective dog and hold the associated piece part tightly in the collet 21. As each spindle 15 advances from station I to station J, a second cam 60' acts on the dog 32 and spindle to release the piece. The cam 60' is mounted on the frame 13 of the machine in a manner similar to that in which the cam 60 is mounted on the frame but having a camming surface designed to engage the flange 33 of the dog provided on the spindle and move the dog along the tubular body 16 thereof away from its associated fingers 27—27. This movement of the dog 32 on the spindle allows the fingers 27—27 to move inwardly under the force applied to the sleeve by the resilient jaws of the collet 21. This movement of the collet in the cam 22 allows the spring jaws of the collet to release their grip on the piece part so that the spindle may be unloaded at station J. Therefore, as each spindle reaches station J with respect to the face of the machine, the piece part previously positioned therein at station A may be removed. When the spindle is advanced from station J to station A a partially completed piece part 24 may be positioned therein so that it may be advanced through the machining stations B to I, inclusive, of the machine.

Figure 4:
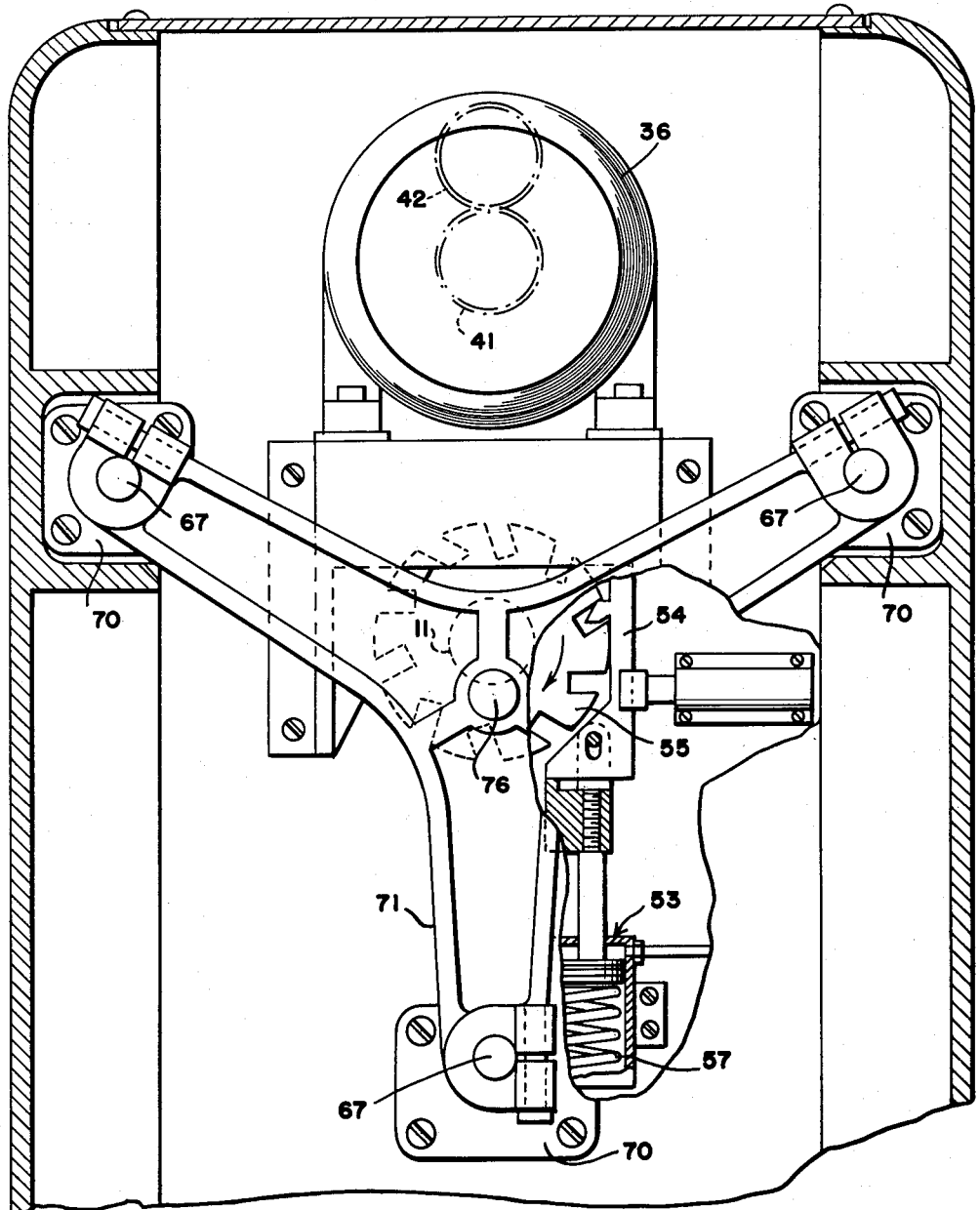
Figure 4 is a vertical sectional view taken along line 4—4 of Figure 1 when looking in the direction of the arrows.

A slidable tool carriage, indicated generally at 65, is provided on the machine and includes a tool head 66 (Figs. 1, 2 and 3) secured on the outer ends of three spaced guide rods 67—67 and a spider 71 (Fig. 4) secured on the rear ends of the guide rods. The guide rods 67—67 are mounted slidably in bushing 68—68 and 70—70 secured in aligned positions at opposite ends of the frame 13 so that the head 66 is parallel to the table 10 and the front end of the frame 13. The head 66 (Fig. 2) is substantially heart shaped, that is, indented at the top, so as to extend over all the driven spindles 15—15 and leave the spindles positioned at the loading and unloading stations A and J accessible or exposed from the front of the machine. The head 66 of the carriage 65 is provided with a plurality of split clamps 72—72 formed integrally thereon to receive and grip tool holders 73—73 designed to hold metal cutting tools such as drills, taps, facing tools, turning tools, etc. The clamps 72—72 as spaced apart on the head 66 so as to hold the tool holders 73—73 in positions in which they are axially aligned with piece parts carried by spindles positioned at the machining stations B to I, inclusive. The carriage 65 is actuated by a hydraulic motor 75 mounted on the frame 13 and having the outer end of its piston rod 76 secured to the spider 71 as shown in Figure 4. The motor 75, designed to receive oil under pressure in a manner hereinafter to be described, moves the tool carriage 65 and the tool head 66 carried thereby to its outermost position with respect to the table 10 during the time required for the motor 53 to turn the table from station to station, and when the table 10 has been stepped moves the carriage 65 and the head 66 inwardly so that the tools carried in the tool holders engage the piece parts 24—24 secured in the driven spindles.

Sequential operation of the table 10, the indexing pin 47 and the tool carriage 65 is obtained through a hydraulic system and an associated electrical circuit and apparatus shown in Figure 5. The hydraulic system is supplied with oil under pressure from a pump 80 driven by an electric motor 81 mounted on a base 82 which supports the frame 13 of the machine. As shown in Figs. 5 and 6, the control system which comprises the hydraulic system and the associated electrical control automatically operates the chucking machine for causing the rotatable table sequentially to move the piece part carried thereby through the machining stations, and while the table is stationary at each station to operate the carriage and other equipment. In such operation oil under pressure flows from the pump 80 through pipes 83 and 84 into a central opening 85 provided in a barrel 86 mounted rotatably in a body 87 of a master control valve indicated generally at 90. The barrel is provided with a radial orifice 91 which may be selectively aligned with radial outlet ports 92, 93 and 94 provided in equally spaced relationship about the body 87 by rotation of the barrel about its central axis. When the orifice 91 is aligned with the outlet port 92, oil under pressure flows from the pump 80 to the motor 75 so as to move the tool carriage 65 and the tool head 66 carried thereby to their outermost positions on the rods 67, as shown in Figures 1 and 3. As shown in Fig. 5, just before the carriage 65 reaches its outermost position, a collar 95 mounted adjustably on one of the rods 67 of the carriage 65 closes a normally open limit switch 96 and connects a solenoid operated valve 97 across busses 98 and 99 supplied with a suitable source of A. C. potential.

When the valve 97 is so energized, it admits oil under pressure from the pipe 83 to a spring loaded hydraulic motor 100 so that the motor moves a rack 101 in a direction to rotate a ring gear 102 mounted on the barrel 86 in a clockwise direction, when viewed in Figure 5. The ring gear 102 is connected to the barrel 86 of the valve 90 in such a manner that it turns the barrel only when the gear 102 is turned in a clockwise direction, and is free to turn in a counter-clockwise direction without turning the barrel 86. The rack 101 and the gear 102 are returned to their starting positions by a spring (not shown) provided in the motor 100 as soon as the collar 95 travels past the limit switch 96 because the valve 97 is de-energized and returns to its normally closed position. This movement of the rack 101 from left to right, as viewed in Figure 5, turns the barrel 86 so as to align the orifice 92 with the outlet port 93. Suitable centering means (not shown) may be provided on the valve for accurately aligning the orifice 91 with the outlet port 93 of the valve.

When the orifice 91 is aligned with the outlet port 93 oil under pressure now flows from the pump 80 to the motor 50 to cause the piston of the motor to withdraw the indexing pin 47 from the recess 52 provided in the table 10. When the pin is completely withdrawn from the recess, the pressure of the oil in the motor 50 builds up sufficiently to cause the oil to flow from the motor 50 through an adjustable throttle valve 103 to the motor 53 so as to cause the motor 53 to move the pawl 54 in a direction to rotate the table 10 in a counterclockwise direction when viewed in Figure 2. When the pawl 54 reaches the end of its operating stroke in the direction, it allows a normally open limit switch 105 engaged by the pawl to close and again energize the solenoid valve 97 in the manner described. Oil under pressure again flows to the motor 100 so as to move the rack 101 to the right and turn the barrel 86 of the valve 90 so as to align the orifice 91 with the outlet port 94 of the valve.

This movement of the valve disconnects the motors 50 and 53 from the pump 80, and the compression springs provided in the motors 50 and 53 and 100 return the indexing pin 47, the pawl 54 and the rack 101 to their normal initial positions. However, the indexing pin 47 merely engages the periphery of the table 10 until an indexing recess 52 is aligned with the pin 47, in which position the spring provided in motor 50 drives the pin into the recess and locks the table against rotation and also axially aligns the spindles 15—15 carried by the table with the tools carried by the tool carriage 65. When the orifice 91 is aligned with the outlet port 94, oil under pressure flows from the pump 80 through a flow control valve 106 to the motor 75. The valve 106 is designed to have an opening that admits the oil to the motor under sufficient pressure to move the carriage 65 and the tool head 66 rapidly toward the table 10. As the tools carried by the tool head 66 engage the piece parts 24—24 secured in the driven spindles 15—15 mounted on the table, a cam 107 mounted on one of the rods 67 of the carriage 65 actuates the control valve 106 so as to decrease its opening and thereby reduce the rate of travel of the tool carriage and the tools carried thereby toward the piece parts to the proper operating speed for the tools with respect to the particular machining operation the tools are designed to perform on the piece parts. When the tool carriage reaches a position in which the tools have completed their machining operations on the piece parts, a collar 110 mounted adjustably on one of the rods 67 of the carriage 65 closes a normally open limit switch 111 which in turn energizes the solenoid valve 97 as described. This energization of the valve admits oil under pressure to the motor 100 so that it moves the rack 101 and turns the barrel of the valve 90 so as to align the orifice 91 with the outlet port 92.

When the orifice 91 of the barrel reaches this position, oil under pressure flows directly to the motor 75 in a direction to cause it to return the carriage 65 rapidly to its outermost position in which all the tools carried thereby are disengaged from the piece parts. Preferably, the collars 95 and 110 are provided with tripping levers (not shown) pivotly mounted thereon so as to actuate their respective limit switches in one direction only. As the carriage nears its outermost position, the collar 95 closes the normally open limit switch 96 as explained hereinabove whereby the valve 97 again is opened so that oil under pressure causes the motor 100 to move the rack 101 and turn the barrel 86 of the master control valve and align the orifice 91 with the outlet port 93. In this position the control valve 90 directs oil under pressure to the motors 50 and 53 in the manner described hereinabove which in turn move the indexing pin 47 and the pawl 54, in that order, so that the pawl can turn the table through an arc sufficient to advance each spindle to its next succeeding machining station with respect to the tools carried by the carriage 65.

The body 87 of the valve 90 is provided with an exhaust port 115 (Figures 5 and 6) which communicates with a groove 116 extending around a substantial portion of the periphery of the barrel 86 so as to communicate only with the outlet ports 93 and 94 when the orifice 91 of the barrel is aligned with the outlet port 92 of the valve. This position of the exhaust groove permits oil to flow from the motors 50 and 53 through the exhaust port 115 to an oil reservoir (not shown) provided in the base 82 of the machine while the motor 75 is moving the carriage 65 outwardly in the manner described hereinabove. When the orifice 91 is aligned with the port 93, the groove 116 does not communicate with the exhaust port 115 whereby oil under pressure in the motor 75 is not released from the motor but holds the tool carriage 65 in its outermost position while the table is turned to its next operating position by operation of the pawl 54 by the motor 53. Movement of the orifice 91 into radial alignment with the port 94 of the valve positions the groove 116 so that it connects the outlet ports 92 and 93 to the exhaust port 115 whereby the spring loaded motors 50 and 53 return to their normal positions and the motor 75 is free to move the carriage 65 toward the table 10.

The valve 97 normally is positioned by an internal spring (not shown) so that the inlet port of the motor 100 is connected to an exhaust pipe 117 which is connected to an oil supply tank (not shown) located in the base 82 of the machine. When the valve 97 is actuated by the energization of its self contained solenoid in the manner described hereinabove, it closes the exhaust pipe to the motor 100 and connects the motor 100 directly to the pump 80. The exhaust port 115 of the valve 90 and the bleeder ports of the hydraulic motors 50, 53 and 100 preferably are connected to the exhaust or low pressure pipe 117.

Figures 7 and 8 show a typical piece part 24 that may be loaded in the spindles 15–15 of the above described machine and advanced through the machining stations B to I, inclusive, which are provided with conventional metal cutting tools to shape the piece part as shown in Figure 8. The piece part shown in Figure 7 includes a solid steel stem 120 and an enlarged head 121 formed integrally on the stem. The machining stations B to I, inclusive, are provided with tools on the tool carriage for boring an elongated hole in the stem 120, for counterboring the head 121, for turning down the head 121 to the proper diameter, and for facing the end of the head 121. These principal machining operations, together with other additional machining operations, are included in the eight machining stations B to I, inclusive. In the preferred embodiment of the invention, each of the tools mounted in the tool holders provided in the tool carriage 65 are aligned axially with the central axis of the spindles 15–15 and each tool therefore moves endwise into the piece parts 24–24 secured in the spindle. In machining a piece part of the same or similar configuration of the part 24 shown in Figures 7 and 8, it is believed to be obvious that all the machining operations required on the piece part may be performed by tools aligned with the central axis of the part and moved endwise into the piece part.

Figure 9:
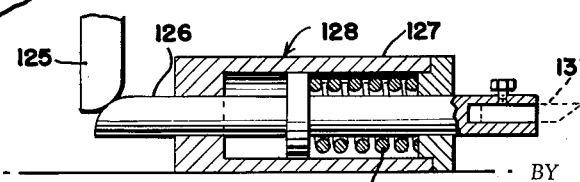
Figure 9 is a vertical sectional view of one type of a reciprocatory tool holder that may be used on the automatic machine shown in Figure 1.

It is to be understood, however, that piece parts may have such a configuration that the tools must be moved into engagement with the piece part at right angles to the longitudinal axis of the part. A simple arrangement of a tool of this type is shown in Figure 9 which includes a cam 125 that may be secured in the tool holders 73–73 provided on the tool carriage at the particular station or stations at which a transversely operating tool is required. When the carriage moves inwardly to bring the tools into engagement with the piece parts secured in the spindles, the cam 125 engages a push rod 126 mounted slidably in a bearing 127 of a tool 128 secured rigidly on the frame 12 of the machine. The cam is so designed that the inward movement of the cam 125 urges the push rod 126 inwardly against the action of a spring 130, and thereby moves a hardened tool 131 secured on the free end of the rod 126 into engagement with the body of the piece part secured in the spindle positioned adjacent to the transverse operating tool 128. It is to be understood that the plurality of transversely operable tools may be positioned at any of the machining stations B to I, inclusive, according to the particular machining operations that may be required on the particular piece part being processed through the machine.

While the operation has been described in conjunction with the preceding detailed description of the apparatus illustrating the invention, the general operation of the more important features of the automatic chucking machine will also be given here.

Let it be assumed that the chucking machine shown in Figure 1 is to be started at the beginning of a working period, in which case, none of the spindles 15—15 contain a piece to be machined. Let it be further assumed that a suitable source of electric power is supplied to the busses 98 and 99, and to the electric motors 36 and 81, and that these motors are operating to drive the spindles 15—15 positioned at the machining stations of the machine and the hydraulic pump 80, respectively. The front end of the machine is positioned at an oblique angle as shown in Figure 1 so that an operator may readily insert a piece part 24 into each spindle 14—14 as it is positioned at the loading Station A of the machine. The operation of the machine will be best understood by following the travel of one of the spindles from the loading station A through the machining stations B to I, inclusive to the unloading station "J." A piece part may be readily inserted in the collet of spindle positioned at station "A" because in passing from station I to station J a cam provided on the frame 12 disengaged the dog 32 from the spring fingers 27—27 of the spindle and thereby allowed the collet to move inwardly in the cam 22 and expand its central opening sufficient to readily receive the stem 120 of the piece part 24. In this respect the spindle positioned at station A will be referred to as the starting spindle. At this time that the carriage 65 is held in its outermost position by the hydraulic motor 75 due to the fact that the orifice 91 of the valve 90 is aligned with the outlet port 92. However, when the motor 75 moved the carriage 65 to its outermost position, the collar 95 closed the limit switch 96 which connected the operating solenoid of the valve 97 across the electrical power supply busses 98 and 99, whereupon the valve 97 was opened to admit oil under pressure to the motor 100 as the carriage 65 reached its outermost position. The admission of oil under pressure to the motor 100 moves the rack 101 from left to right, as viewed in Figure 5, and turns the gear 102 and the barrel 86 of the valve in a clockwise direction so as to align the orifice 91 with the outlet port 93. This operation of the valve takes place while the oil under pressure causes the motor 75 to hold the carriage 65 and the tools mounted thereon in their outermost positions.

The alignment of the orifice 91 of the port 93 admits oil under pressure to the motors 50 and 53 which withdraw the indexing pin 47 from its recess 52 in the table 10 and turn the table in a counterclockwise direction as viewed in Figure 2, respectively, to advance the starting spindle one station, i. e. to station "B." When the table is properly indexed so as to position the starting spindle at station "B," the microswitch 105 is closed momentarily and connects the valve 97 across the busses 98 and 99.

This energization of the valve 97 admits oil under pressure to the motor 100 which in turn causes the motor to move the rack in the gear to align the orifice 91 with the outlet port 94 of the valve 90. In this position the valve 90 admits oil under pressure to the opposite end of the motor 75 through a flow control valve 106. At the same time the motors 50 and 53 are connected to the exhaust port 115 of the valve through the groove 116 provided in the barrel 86 of the valve 90. Likewise, the opposite end of the motor 75 is connected to the exhaust port of the valve so that oil under pressure flowing through the control valve is free to move the carriage 65 inwardly and carry the tool positioned at station "B" into engagement with the piece part located at station "B." When the carriage completes its stroke in this direction, the collar 110 closes the limit switch 111 which in turn connects the operating solenoid of the valve 97 across the busses 98 and 99. This energization of the solenoid of the valve 97 opens the valve and admits oil under pressure to the motor 100 which turns the barrel 86 of the valve 90 so as to align the orifice 91 with the port 92. Oil under pressure now flows through the valve 90 to the other end of the motor 75 and moves the carriage 65 to its outermost position. While these operations are taking place, the operator inserts a piece part 24 in the spindle now positioned opposite station A of the machine. Since the machine was empty at the start of the work period no piece parts are available to be removed from the spindle positioned at station J at this time. Outward movement of the carriage 65 by the motor 75 again closes this limit switch 96 and energizes the valve 97 so that the motor 100 turns the barrel 86 so that the port 91 is aligned with the port 93. Oil under pressure flows to the motors 50 and 53 which withdraw the indexing pin 47 and turn the table, respectively, until the starting spindle is positioned at station "C."

When the carriage 65 moves inwardly to bring the tool located at station C on the carriage 65 into engagement with the piece part being rotated in the spindle positioned at station C, the operator places another piece part 24 in the spindle positioned adjacent to station A. This procedure is repeated automatically by the motors 50, 53, 75 and 100, and as a result, the starting spindle is successively positioned at each of the remaining machining stations D, E, F, G, H and I. It is obvious that each time an empty spindle is positioned adjacent to or at station A, the operator can place a piece part 24 therein. When the starting spindle reaches station J all required machining operations have been performed on the piece part by the tools secured to the carriage at the stations B to I, inclusive. As each spindle advances from station I to the unloading station J, the dog 32 of the spindle engages the cam 60' which moves the dog so as to release the spring fingers 27—27 and allow the collet 21 associated therewith to relax its grip on the piece part positioned therein. However, each time a spindle is advanced from station A to station B the dog 32 on the spindle engages the cam 60 which moves the dog so as to cam the spring fingers 27—27 of the collet outwardly and thereby cause the collet to grip the piece part positioned therein tightly in the manner described. The dog remains in engagement with the spring fingers in this manner and thereby causes the collet to grip the piece part tightly as the part is advanced through the machining stations B to I, inclusive.

When the starting spindle reaches station J, all the spindles now contain a piece part 24, and the machine is operating at its maximum output because each movement of the tool carriage toward the table performs a machining operation on the piece parts positioned in the eight spindles being driven by the motor 36. As the operation of the machine continues in the manner described, the operator removes the finished piece part from each spindle as it is positioned at station J, and positions an unfinished piece part in the same spindle when it is advanced to station A. Since the spindles positioned at station J and A are not engaged by the chain and are not rotating, the parts may be withdrawn and inserted therein without injury to the part or danger of injury to operator. It should be noted that all of the rotating spindles on the table are completely covered by the tool carriage which acts also as a guard in preventing an operator from inadvertently resting his hands or other parts of his body on the rotating spindles. By providing all of the tools on the carriage 65 accurate positioning and adjustment of the tools may be had because after they are adjusted properly they can not become out of adjustment with respect to each other. This arrangement eliminates the use of cams and complex gearing and associated mechanism required for obtaining independent operation of transversely operated tools such as are found on conventional automatic chucking machines.

It is to be understood that suitable automatic loading and unloading means may be provided on the machine to eliminate need of having an operator place an unfinished piece part in the spindles and removing the finished piece parts from the spindles. Many different types of loading and unloading devices are available and may be used readily with the above described machine.

While the above described metal working machine is particularly adapted for performing the necessary machining operations on a piece part like that shown in Figure 8, it is to be understood that the machine may be modified to perform many different types of machining operations on different types of piece parts without departing from the spirit and scope of the invention.

What is claimed is:

1. An apparatus for simultaneously machining a plurality of piece parts, which comprises a frame, a rotatable shaft, bearing means fixed on said frame for obliquely supporting said shaft, a rotatable table carried at the front upper end of said shaft having a plurality of rotatable work holders spacedly positioned thereon, hydraulic means for turning the table so as to advance the work holders carried thereby in a step by step manner through a loading station, a series of machining stations and an unloading station of the apparatus, the last said means comprising indexing means for accurately locating each work holder at each of said stations, each of said work holders comprising part-engaging means designed to receive, grip and release a piece part to be machined, a sildable tool carriage for supporting a plurality of tools designed to perform various operations on the piece parts held in the spindles, one tool being provided on the carriage at each machining station of the apparatus, means for rotating only those spindles positioned at the machining stations of the apparatus to turn the piece parts positioned therein with respect to the tools, stationary cam means engaged by each work holder as it is advancing from the loading position to the first machining position to cause said part engaging means of the work holder to grip the part tightly, hydraulic means for moving the tool carriage parallel to said shaft in a direction to cause the tools to engage the piece parts carried by the table and in an opposite direction so as to disengage the tools from the piece part after the carriage has reached its innermost position, means engaged by each work holder as it is advancing from the last machining position to the unloading position to cause said part engaging means of the work holder to release its grip on the piece part positioned therein so that it may be removed from the table, and control means including a single hydraulic control valve for causing the table turning means, the indexing means and the tool carriage moving means to operate in timed relation with respect to each other so that each piece part carried by the table is successively engaged by the tools provided at each machining station of the apparatus.

2. An apparatus for machining a plurality of piece parts, which comprises a rotatable table having a plurality of rotatable work holders positioned spacedly thereon, hydraulic means for indexing the table so as to advance the work holders in a step by step manner through a series of positions consisting of a loading station, a series of successive machining stations and an unloading station of the apparatus, each of said work holders comprising a collet for receiving and gripping a piece part, a slidable tool carriage for supporting a plurality of tools designed to perform various machining operations on the piece parts held in the work holders, one tool being provided on the carriage for performing a predetermined machining operation at each machining station of the apparatus, means for rotating only the work holders positioned at the machining stations so as to turn the piece parts positioned therein with respect to the tools, hydraulic means for moving the tool carriage between predetermined limits toward and away from the table carrying the piece parts, means actuated by the movement of the table as it reaches an indexed position for causing the carriage moving means to move the carriage comparatively rapidly toward the tools until they engage the piece parts, and means actuated by the carriage after it has travelled a predetermined distance toward said piece part to cause said tool carriage to travel at a slower rate of speed as the tools perform their respective machining operations on the piece parts carried by the work holders positioned at the machining stations, means actuated by the carriage when the tools complete their machining operations causing the carriage moving means to move the carriage in an opposite direction to its outermost position, and control means including a single hydraulic control valve for operating the indexing means, and the tool carriage moving means in timed relation with each other so that each part carried by the table is successively automatically positioned at each machining station of the apparatus and is engaged by each tool provided on the tool carriage, and means operated by movement of each work holder from its last machining station for causing its collet to release its grip on a piece part positioned therein when it advances from the last machining station to the unloading station so that the part may be readily removed from the work holder.

3. An apparatus for machining a plurality of piece parts simultaneously, which comprises a rotatable table having a plurality of rotatable work holders positioned spacedly thereon, hydraulic means for turning the table so as to advance the work holders in a step by step manner through a loading station, a series of machining stations and an unloading station on the apparatus, each work holder provided on the table comprising part-engaging means designated to receive, grip and release a piece part to be machined, cam means engaged by each work holder as it is advanced from the last machining station of the apparatus to the unloading station for causing said part-engaging means of the work holder to release its grip on the piece part positioned therein so that it may be removed from the table, a spring biased indexing pin designed to engage recesses provided in the periphery of the table so as to locate the work holders in alignment with said stations of the apparatus, a slidable tool carriage for supporting a plurality of tools designed to perform various machining operations on the piece parts positioned in the work holders, one tool being provided on the carriage for each machining station of the apparatus, means for rotating only the work holders positioned at the machining stations of the tool carriage to turn the piece parts positioned therein with respect to the tools mounted on the carriage, hydraulic means for moving the tool carriage from an outermost position in which the tools carried thereby are disengaged from the piece parts secured in the work holders to an innermost position in which the tools carried thereby engage the piece parts secured in the rotating work holders and for moving the carriage from said innermost position to said outermost position, hydraulic means for disengaging the indexing pin from the recesses provided in the periphery of the table, and master control means including a single hydraulic control valve operable by the slidable tool carriage in its outermost position so as to cause indexing pin actuating means to operate and withdraw the pin from a recess in the table and cause the table turning means to advance the work holders to their next succeeding machining positions, said master control means also being operable by the table turning means so as to cause the carriage moving means to move the carriage inwardly so that the tools engage the piece parts positioned in the work holders after the table has been turned and indexed in its proper position, and by the carriage at its innermost position for causing the carriage moving means to return the carriage to its outermost position when the tools carried thereby have completed their respective machining operations on the piece parts carried by the work holders, and by the carriage moving to its outermost position to initiate a step-operation of said table-turned means.

4. An apparatus for simultaneously machining a plurality of piece parts, which comprises a rotatable table, a plurality of rotatable spindles equally spaced about the periphery of the table, means provided in each spindle for receiving a piece part to be machined, an indexing means including a first hydraulic motor for turning the table so as to advance the work holding spindles and the piece parts carried therein in a step by step manner through a loading station at which a piece part may be positioned in a work holding spindle, a series of machining stations and an unloading station of the apparatus, a tool carriage mounted slidably with respect to the table, means including a second hydraulic motor for moving the tool carriage from its outermost position with respect to the table to an innermost position with respect to the table to cause the tools carried thereby to engage the piece parts mounted in the rotating spindles and for moving the carriage from its innermost position to its outermost positions, means for rotating only the spindles positioned at the machining stations so as to turn the piece part positioned therein with respect to the tools, a hydraulic system including means for supplying oil under pressure to the hydraulic motors provided for turning the table and moving the tool carriage, and control means comprising a single control valve connected in the hydraulic system for directing oil under pressure to the hydraulic motors and an energizable means for actuating said control valve so as to effect a sequential operation of said first hydraulic motor that causes the table to successively position spindles at each machining station of the apparatus and to effect an operation of said second hydraulic motor for actuating the tool carriage to move the carriage and the tools carried thereby into engagement with the piece parts provided on the table and to move the carriage in the opposite direction to disengage the tools from the piece parts after each operation of said first hydraulic motor, whereby successive operation of the motors in such timed relation with respect to each other positions each piece part secured in the spindles so as to be engaged by the tools carried by the tool carriage.

5. An apparatus for simultaneously machining a plurality of piece parts, which comprises a rotatable table, a plurality of rotatable spindles equally spaced about the periphery of the table, each of said spindles having means for slidably receiving a piece part to be machined, means including a hydraulic motor for turning the table so as to advance the piece parts positioned in the spindles in a step by step manner through a loading station, a series of machining stations and an unloading station of the apparatus, indexing means actuated by a hydraulic motor for accurately locating the spindles with respect to said stations of the apparatus, a slidable tool carriage for supporting a plurality of tools designed to perform various machining operations on the piece parts held in the spindles, one tool for performing a predetermined machining operation at each machining station of the apparatus, means engaged by each spindle as it is advancing from the loading station to the first machining station for causing the holding means to grip the part tightly, means engaged by each spindle as it is advancing from the last machining station to the unloading station for causing the holding means to release its grip on the piece part positioned therein so that the piece part may be removed from the table, means for rotating only the spindles positioned at the machining stations of the apparatus to turn the piece parts positioned therein with respect to the tools mounted on the tool carriage, means including a hydraulic motor for moving the tool carriage from its outermost position in which the tools carried thereby are disengaged from the piece parts to an innermost position in which the tools engage the piece parts and for moving the carriage in an opposite direction to its outermost position, a hydraulic system including a source of fluid under pressure a master control valve for controlling the admission of fluid under pressure to the hydraulic motors, a hydraulic motor for operating the master control valve, an electrically operated valve for controlling the admission of fluid under pressure from said hydraulic system to the last mentioned hydraulic motor, means actuated by the tool carriage in its outermost position for causing the electrically operated valve to admit oil under pressure to the last mentioned motor so as to cause the motor to position the control valve so that it admits oil under pressure to the hydraulic motor provided for turning the table, means operated by movement of the table turning means for causing said valve-operating hydraulic motor to position the control valve so that oil under pressure flows to the carriage actuating motor in a direction to cause the motor to move the carriage inwardly so that the tools engage the piece parts positioned in the rotating spindles, and means actuated by the tool carriage in its innermost position for causing said valve-operating hydraulic motor to position the control valve so as to admit oil under pressure to the carriage operating motor in a direction to cause the motor to return the carriage to its outermost position, said means actuated by the tool carriage and the table turning means being designed to provide continuous operation of the hydraulic motors so as to successively position the piece parts carried by the spindles at each machining station of the apparatus.

6. Apparatus as defined in claim 4 but further characterized by said control means comprising an operable means associated with said carriage and said hydraulic motor for moving the carriage, and operable by movement of said carriage for causing the last said hydraulic motor to reduce the rate of travel of the carriage toward the table as the tools perform their respective machining operations on the piece parts.

7. Apparatus as defined in claim 6 but further characterized by said operable means comprising limit switches operated by said carriage.

8. An automatic chucking machine for simultaneously machining a plurality of piece parts, which comprises a frame having a front comprising a rotatable table having a plurality of circumferentially-spaced work holders rotatably carried by said table, hydraulic means for turning the table so as to advance the work holders in a step by step manner through a loading station, a series of machining stations, and an unloading station, said loading and unloading stations being adjacent, the last said means including indexing means for accurately locating each work holder at each of said stations, each of said work holders comprising a sprocket wheel and part-engaging means designed to receive, grip or release a piece part, said part-engaging means comprising a cam member, cam means carried by said frame between said loading station and the first of said machining stations for directly successively engaging said cam members for causing the part-engaging means thereof to grip the piece part therein, cam means carried by said frame between the last of said machining stations and said unloading station for directly successively engaging said cam members for causing the part-engaging means thereof to reelase the piece part therein, a slidable tool carriage comprising a tool head outside said frame and including circumferentially-spaced tool holders stationary with respect thereto for supporting a plurality of tools designed to perform various machining operations on the piece parts in the work holders at the machining stations, one tool being provided at each machining station of the apparatus, means comprising a sprocket chain inside said frame and engaging the sprocket wheels of only the work holders positioned at the machining stations of the apparatus to turn the piece parts positioned therein with respect to the tools carried by the tool carriage, a plurality of guide rods carried by said frame and extending outwardly about said table and carrying said tool carriage, said rods being parallel to said shaft, hydraulic means for moving said tool carriage in a direction toward the table so as to cause the tools to engage the piece parts and in a direction to disengage the tools from the piece parts, and control means including a single hydraulic control valve for causing the table turning means, the indexing means and the carriage moving means automatically to operate in timed relation with each other so that each piece part carried by the table is successively engaged by each tool provided at the machining stations of the apparatus.

9. An automatic chucking machine as defined in claim 8 but further characterized by said tool head having a portion indented to expose said loading and unloading stations.

10. An automatic chucking machine for simultaneously machining a plurality of piece parts, which comprises a frame having a front comprising a rotatable table having a plurality of circumferentially-spaced work holders rotatably carried by said table, indexing means comprising a first hydraulic motor operable for turning the table so as to advance the work holders in a step by step manner through a loading station, a series of machining stations, and an unloading station, said loading and unloading stations being adjacent, each of said work holders comprising part-engaging means designed to receive, grip or release a piece part, said part-engaging means comprising a cam member, cam means carried by said frame between said loading station and the first of said machining stations for directly successively engaging said cam members for causing the part-engaging means thereof to grip the piece part therein, cam means carried by said frame between the last of said machining stations and said unloading station for directly successively engaging said cam members for causing the part-engaging means thereof to release the piece part therein, a slidable tool carriage comprising a tool head including circumferentially-spaced tool holders stationary with respect thereto for supporting a plurality of tools designed to perform various machining operations on the piece parts in the work holders, one tool being provided at each machining station of the apparatus, means for rotating only the work holders positioned at the machining stations of the apparatus to turn the piece parts positioned therein with respect to the tools carried by the tool carriage, means comprising a second hydraulic motor for moving the tool carriage parallel to said shaft in a direction toward the table so as to cause the tools to engage the piece parts and in a direction to disengage the tools from the piece parts, and control means for causing the indexing means and the carriage moving means automatically to operate in timed relation with each other so that each piece part carried by the table is successively engaged by each tool provided at the machining stations of the apparatus, said control means comprising sequence-operating means comprising a hydraulic system including a single hydraulic control valve for controlling said hydraulic motors, solenoid means for operating said single hydraulic control valve, said sequence-operating means comprising a plurality of limit switches operated by movement of said carriage and of said indexing means for controlling said solenoid means.

11. An automatic chucking machine for simultaneously machining a plurality of piece parts, comprising a frame having an upstanding front, a shaft, bearing means carried by said frame and rotatably supporting said shaft, a table carried by said shaft and comprising a part of said front, said table being rotatable with said shaft and having a plurality of circumferentially-spaced work holders, each work holder comprising a tubular member extending rearwardly from said front, a sprocket wheel on the outside of said tubular member, a collet, and operable cammable means for causing said collet to grip or release a piece part, a plurality of guide rods triangularly arranged in said frame and extending outwardly beyond said front, a spider at the rear of said frame, means comprising bearings in said spider for supporting said guide rods, a tool carriage mounted on the extending ends of said rods, indexing means including a hydraulic motor in said frame for indexing said table and shaft so as to advance said work holders in a step by step manner through a loading station, a series of machining stations and an unloading station, said loading and unloading stations being adjacent, a cam between said loading station and the first of said machining stations, and between said unloading station and the last of said machining stations for operating said cammable means, a driving sprocket wheel carried in said frame between a pair of said guide rods, a sprocket chain engaging said driving sprocket wheel and said sprocket wheels only of those of said work holders which are at said machining stations, means for rotating said driving sprocket wheel, said tool carriage comprising a tool head outside said frame and facing said table, said tool head including circumferentially-spaced tool holders stationary with respect thereto for supporting a plurality of tools designed to perform various machining operations on the piece parts in the work holders at said machining stations, said tool head having an indentation exposing said loading and unloading stations, a reciprocating means including a hydraulic motor in said frame for reciprocating said tool carriage between innermost and outermost positions for machining and non-machining operations, and control means responsive to the position of said tool carriage for initiating operation of said indexing means said control means including limit switches actuated in response to predetermined movement of said table and carriage and further including a single hydraulic control valve and operating solenoid operated upon actuation of said switches for automatically operating said hydraulic motors in a relation wherein said table turns only when said carriage is outwardly away from said front a sufficient distance to stop machining operations.

12. An automatic chucking machine of a type described comprising a frame having an upstanding front sloped with respect to the vertical, a shaft perpendicular to said front, bearing means carried by said frame and rotatably supporting said shaft, a table carried by said shaft and comprising a part of said front, said table being rotatable with said shaft and having a plurality of circumferentially-spaced work holders, each work holder comprising a tubular member extending rearwardly from said front, means inside said frame for indexing said table and shaft so as to advance said work holders in a step by step manner through a loading station, a series of machining stations, and an unloading station, said loading and unloading stations being adjacent, a reciprocable tool carriage comprising a tool head substantially parallel to said front and containing a plurality of circumferentially-spaced tool holders stationary with respect thereto and supporting a plurality of tools designed to perform various machining operations on parts in the tool holders at said machining stations, means for reciprocating said carriage in a direction parallel to said shaft and between machining and non-machining positions, electric switch means responsive to the relative position of said table and carriage and sequential unitary control means actuated by said switches to control the reciprocation of said carriage and the step by step advancing of said work holders.

13. An automatic chucking machine as defined in claim 12 but further characterized by said loading and unloading stations being at the top of said table, and said tool head having an indentation exposing said loading and unloading stations.

14. An apparatus for simultaneously machining a plurality of piece parts, which comprises a rotatable table, a plurality of rotatable spindles equally spaced about the periphery of the table, means provided in each spindle for receiving a piece part to be machined, an indexing means including a first hydraulic motor for turning the table so as to advance the work holding spindles and the piece parts carried therein in a step by step manner through a series of stations including a series of machining stations, a tool carriage mounted slidably with respect to the table, means including a second hydraulic motor for moving the tool carriage from its outermost position with respect to the table to an innermost position with respect to the table to cause the tools carried thereby to engage the piece parts mounted in the rotating spindles and for moving the carriage from its innermost position to its outermost position, means for rotating only the spindles positioned at the machining stations so as to turn the piece parts positioned thereat with respect to the tools, a hydraulic system including means for supplying oil under pressure to the first and second hydraulic motors, control means comprising a single control valve connected in the hydraulic system for directing oil under pressure to the hydraulic motors, and an energizable means for actuating said control valve so as to effect a sequential operation of said first hydraulic motor that causes the table to successively position spindles at each machining station of the apparatus and to effect an operation of said second hydraulic motor for actuating the tool carriage to move the carriage and the tools carried thereby into engagement with the piece parts provided on the table and to move the carriage in the opposite direction to disengage the tools from the piece parts after each operation of said first hydraulic motor, whereby successive operation of the motors in such timed relation with respect to each other, positions each piece part secured in the spindles so as to be engaged by the tools carried by the tool carriage.

References Cited in the file of this patent

UNITED STATES PATENTS

| | | |
|---|---|---|
| Re. 19,485 | Brophy | Mar. 5, 1935 |
| 405,749 | Tucker | June 25, 1889 |
| 1,511,565 | Kinsley | Oct. 14, 1924 |
| 1,848,006 | Ferris | Mar. 1, 1932 |
| 2,055,434 | Gridley et al. | Sept. 22, 1936 |
| 2,068,084 | Stahlhammer | Jan. 19, 1937 |
| 2,079,637 | Simpson | May 11, 1937 |
| 2,094,817 | Poppensieker | Oct. 5, 1937 |
| 2,118,025 | Curtis | May 17, 1938 |
| 2,271,583 | Dornhofer et al. | Feb. 3, 1942 |
| 2,291,382 | Duglin | July 28, 1942 |

FOREIGN PATENTS

| | | |
|---|---|---|
| 587,862 | Germany | Mar. 23, 1930 |